United States Patent Office 3,353,209
Patented Nov. 21, 1967

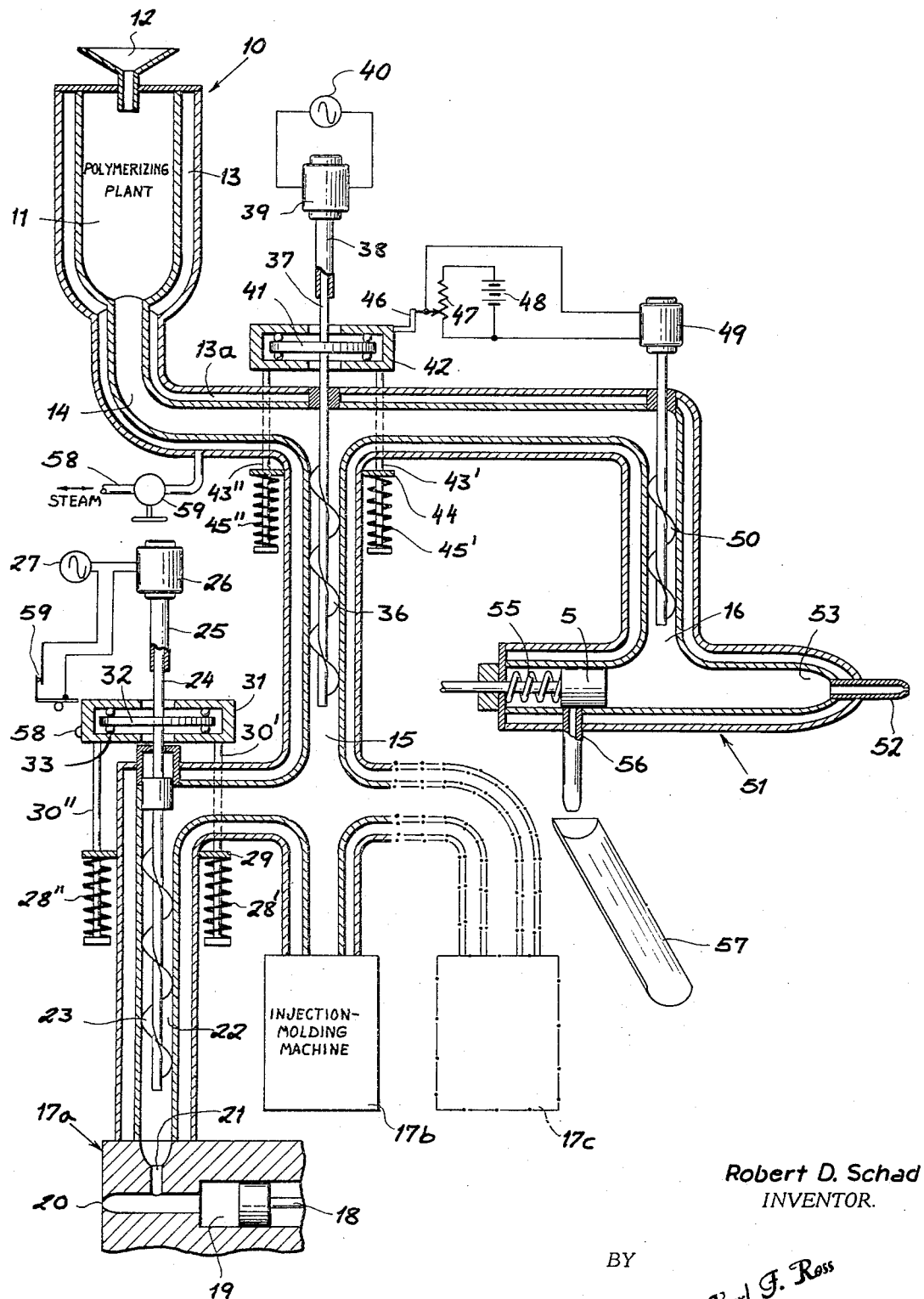

3,353,209
DISTRIBUTION SYSTEM FOR THERMO-
PLASTIC MOLDING MATERIALS
Robert Dietrich Schad, Toronto, Ontario, Canada,
assignor to Husky Manufacturing & Tool Works
Limited, Toronto, Ontario, Canada, a corporation
of Canada
Filed Oct. 11, 1963, Ser. No. 315,611
4 Claims. (Cl. 18—4)

My present invention relates to a system for and a method of supplying thermoplastic material to one or more consumers of variable capacity such as, for example, a plurality of molding machines adapted to be operated together or in various combinations.

Heretofore, such machines had to be individually supplied with the thermoplastic material required, usually in solid granular form, which was then liquefied by heating just prior to the molding operation. Since the material is originally available from the polymerization plant in a heated state, the subsequent cooling, storage and reheating are wasteful of thermal energy. In view of the fluctuating consumption of thermoplastic material by a single molding machine (owing to, for example, needed repairs and adjustment in the course of its operation), and a fortiori, by a group of such machines operating in parallel, it has heretofore not been practical to design a polymerization plant in such manner that its output would keep pace with the requirements of the load or loads to be supplied thereby.

My present invention has for its principal object the provision of a novel system for and method of distributing freshly prepared polymeric—especially thermoplastic—material to one or more molding machines or similar consumer units in a manner avoiding the aforestated inconveniences.

A more specific object of this invention is to provide a distributing system for thermoplastic material adapted to supply simultaneously such dissimilar loads as one or more injection-molding machines and one or more extruders.

The foregoing objects are realized, pursuant to this invention, through the provision of a distributing system for supplying fluid thermoplastic material from a central polymerization plant to a plurality of loads including at least one primary consumer of fluctuating capacity, such as one or more injection-molding machines, and at least one secondary consumer capable of adjusting itself instantaneously and automatically to different rates of supply within a given range, such as an extruder. The system further includes means for sensing the reaction pressure from the primary consumer, as a measure of its instantaneous capacity, and for shunting a commensurately greater or less proportion of the output of the central polymerization plant to the secondary consumer in response to changes in this reaction pressure. The central plant may be located at a railroad siding, a seaport or some other commercial terminal to which the organic starting material (in monomeric or incompletely polymerized form) may be conveniently delivered in large quantities.

It has already been proposed to provide an individual injection-molding machine with a spring-loaded feed screw adapted to supply precompressed molding material to a main compression chamber from which the material is intermittently injected into a mold by a reciprocating piston; reference in this connection may be made to commonly assigned U.S. patent application Ser. No. 167,825, filed Jan. 25, 1962, by Herbert Rees, now U.S. Patent 3,117,348, granted Jan. 14, 1964. With a machine of this type, the rhythmic variations in reaction pressure are not, or only in greatly attenuated form, communicated to the supply source. A distributing system according to the present invention is, therefore, particularly suitable for use with this kind of molding machine since the sensing mechanism will thereby be prevented from responding to the rapid pressure fluctuations occurring in the normal operation of the machine.

Pursuant to a more specific feature of my invention, I utilize a spring-loaded feed screw of this description not only for the individual molding machines but also in a common supply conduit therefor as part of the sensing mechanism. If the demand of the primary consumer for thermoplastic material becomes less for any reason, e.g. because of a temporary dropout of one or more molding machines, the increased reaction pressure forces back the spring-loaded sensing screw, via a control device electrically or otherwise coupled therewith, to redirect the added overflow from the polymerization plant to the secondary consumer. This shifting of the supply can be carried out, advantageously, with the aid of another feed screw associated with the extruder or extruders constituting all or part of the secondary consumer, as by the simple expedient of accelerating the operation of the last-mentioned screw. Conversely, when the injection-molding plant operates at full capacity, the same mechanism throttles the supply to the extruder, advantageously by reducing the speed of its feed screw which in this manner also acts as a dosing valve. If the capacity of the extruder should be temporarily exceeded upon a near or complete shutdown of the injection-molding plant, a further outlet may be opened to discharge the excess in the form of solid bulk material; in some instances the extruder or extruders may be dispensed with and the entire overflow may be recovered in bulk form.

The invention will be described in greater detail with reference to the accompanying drawing the sole figure of which shows diagrammatically a distributing system of the type outlined hereinabove.

The system shown in the figure includes a central polymerization plant 10 with a reaction chamber 11 into which liquid monomer and other ingredients, such as reaction catalysts and colorants if required, are admitted via an inlet 12. Chamber 11 is heated in the usual manner, by suitable means not shown, and is clad with a thermally insulated jacket 13 formed by concentric walls. An extension 13a of this insulating jacket surrounds a duct 14 which leads from the outlet of chamber 11 to a pair of branch conduits 15 and 16. Conduit 15 supplies the principal load which is constituted by several injection-molding machines 17a, 17b etc., only the injection mechanism of machine 17a having been shown in detail. This mechanism includes a reciprocable piston 18 in a compression chamber which communicates via an orifice 20 with a mold cavity not shown. The orifice 20 is periodically opened and closed, in step with the reciprocation of piston 18, to admit the compressed plastic mass into the mold as is well known per se. Molding material in a preliminary state of compression arrives at the entrance port 21 of chamber 19 from an individual extension 22 of branch conduit 15, conduit 22 is occupied by a lead screw 23 whose stem 24 is telescopically received in the tubular shaft 25 of a driving motor 26 powered by a source 27. Stem 24, which is suitably profiled to mate with shaft 25 for joint rotation, is axially displaceable against the force of a plurality of compression springs 28', 28" (only two shown) which bear upon a fixed mounting plate 29 and upon the enlarged ends of respective rods 30', 30" secured to a bearing housing 31. A disk 32 rigid with shaft 24 is rotatably mounted in housing 31 via balls 33 so as to be in pressure-transmitting relationship with the springs 28', 28". Shaft 24 also carries a head 34 which is axially movable in a cylindrical socket 35 in order to minimize the changes in the reaction pressure which is communicated back to the conduit 15 as the screw 23 periodically advances and recedes in step with the reciprocation of piston 18.

Conduit 15 contains a feed screw 36 which is generally similar to screw 23 and has its stem 37 telescopically received by a tubular shaft 38 of a motor 39 for entrainment thereby, motor 39 being energized by a source 40. Stem 37 is again axially shiftable and carries a disk 41 journaled in a ball-bearing housing 42 from which rods 43', 43" extend through a mounting plate 44 under pressure by a respective loading spring 45', 45". Housing 42 carries the cylinder 46 of a potentiometer 47 connected across a source of current here shown diagrammatically as a battery 48; this source powers a motor 49 driving a feed screw 50 within branch conduit 16. The latter conduit terminates at an extruder 51, representative of any number of such extruders connected in parallel, which has a forming nozzle 52 at the front end of a pressure chamber 53 and is provided at the rear end of that chamber with a plunger 54 loaded by a spring 55. Plunger 54 normally obstructs an outlet 56 leading to a receiver for bulk material, here shown schematically as a chute 57.

The insulating jacket 13a of the conduit system 14–16 and its extensions is advantageously provided at several locations with pipes 58 (only one shown) controlled by normally closed valves 59 for the purpose of circulating a heating fluid, such as superheated steam, therethrough. In the normal operation of the illustrated system, the heat losses on the way from the the central polymerization plant 11 to the consumers 17a, 17b etc. and 51 will be minimal so that little or no supplemental heating of the flowing mass will be required. In the case of temporary breakdown or deactivation of the system, however, the conduits may become clogged with solids which must be liquefied before operations can be resumed, this being advantageously accomplished by the steam-circulating devices 58, 59.

In operation, freshly polymerized plastic material is fed at a substantially constant rate from plant 11 through the conduit 14 and its branches. The supply rate is advantageously larger than the maximum consumption rate of the combined injection-molding machines 17a, 17b etc. so that an overflow is always available for operation of the extruder or extruders 51. As long as injection molding proceeds at full capacity, the reaction pressure in the conduit 15 will be relatively low as the feed screw 50 in conduit 16 operates at slow speed to deliver the overflow to the extruder. Owing to the low feeding pressure of screw 50, pressure within chamber 53 is substantially at a minimum and plunger 54 is in its forward position, covering the emergency outlet 56.

If, say, the machine 17a is taken out of service, feed screw 23 is arrested so that pressure builds up in the conduit 15; this situation may arise, for example, upon a malfunction of the injection mechanism with a blocking of orifice 20 which causes the feed screw 23 to recede, against the force of its springs 28' and 28", so far that a cam 58 on bearing housing 31 opens a switch 59 in the circuit of motor 26 to de-energize the latter. The increased reaction pressure in conduit 15 now forces the feed screw 36 back against the action of its springs 45', 45", thereby displacing the slider 46 of potentiometer 47 and increasing the armature current of motor 49 to speed up the screw 50 in channel 16. The more rapid operation of this screw now directs the augmented overflow from plant 11 into extruder chamber 53 where the greater supply pressure represses the plunger 54 against the force of its spring 55. Plunger 54 yields sufficiently to let the pressure in chamber 53 build up to the value necessary to drive the fluid thermoplastic material through the nozzle 52 at an increased speed commensurate with the higher delivery rate. If this delivery rate should become so large as to exceed the output capacity of the extruder 51, plunger 54 will uncover the outlet 56 to let the oversupply leave the chamber 53 via the chute 57 in the form of bulk material. Thus, the plunger 54 combines the functions of a pressure regulator, a safety valve and a capacitive impedance adapted to absorb short-term pressure surges so that the latter will not objectionably affect the operation of the extruder.

The aforedescribed sequence of operations is, of course, reversed when the demand of the injection-molding plant 17a, 17b etc. returns to a higher level.

In will be advantageous to choose the relative capacities of the injection machines 17a, 17b etc. and the extruder or extruders 51 in such a way that expected variations in the reaction pressure within conduit 15 (due to normal mold changes, overhaul periods and the like) will alter the supply rate of feed screw 50 only within limits well tolerated by the extruder. Consider, for example, a plant with twelve injection-molding machines of which, on the average, ten operate concurrently. If the combined consumption of these ten machines equals the normal supply rate to the extruding plant, and if the latter plant is capable of efficiently operating in a range from 80 to 120% of its normal capacity, then the extruder will be able to handle the reduced supply when all the molding machines are working and will also be able to absorb the excess in the event that the number of operating injection-molding machines drops to nine or eight.

My invention is, of course, not limited to the specific embodiment described and illustrated but may be realized in various modifications without departing from the spirit and scope of the appended claims.

I claim:
1. In a system for the production of thermoplastic articles, in combination:
   a central polymerization plant;
   a first load of fluctuating capacity including at least one injection-molding machine;
   a second load including at least one extruder adapted to adjust to different rates of supply;
   thermally insulated conduit means extending from said polymerization plant to said first and second loads for distributing fluid plastic material thereto, said conduit means including a first branch leading to said first load and a second branch leading to said second load;
   first feed means for said plastic material in said first branch including a sensor responsive to reaction pressure from said first load;
   variable-speed second feed means in said second branch for directing to said second load a varying overflow of plastic material from said polymerization plant in excess of a quantity usable by said first load; and
   control means for said second feed means coupled to said sensor for adjusting the rate of flow of said plastic material in said second branch to compensate for reaction pressure variations in said first branch.

2. The combination as defined in claim 1 wherein said first feed means comprises an axially displaceable feed screw and spring means urging said feed screw forwardly within said first branch in the flow direction of said plastic material, said sensor including contact means coupled with said feed screw for entrainment thereby.

3. The combination defined in claim 1 wherein said extruder is provided with an auxiliary outlet and with valve means responsive to a predetermined feed pressure for discharging excess plastic material in bulk form through said outlet.

4. The combination defined in claim 2 wherein said injection-molding machine is provided with a compression chamber, an independently reciprocating piston and a spring-loaded axially movable feed screw in cascade with the first-mentioned feed screw for delivering plastic material from said first branch in a precompressed state to said compression chamber.

References Cited

UNITED STATES PATENTS

| 150,545 | 5/1874 | Duckett | 137—118 |
| 2,478,013 | 8/1949 | Roddy | 264—329 |
| 2,593,507 | 4/1952 | Wainer | 264—328 |
| 2,734,226 | 2/1956 | Willert | 18—12 |
| 3,090,994 | 5/1963 | Stenger | 264—328 |
| 3,191,233 | 6/1965 | Linderoth | 264—329 |

J. SPENCER OVERHOLSER, *Primary Examiner.*

R. D. BALDWIN, *Assistant Examiner.*